United States Patent
Lee et al.

(10) Patent No.: US 11,886,649 B2
(45) Date of Patent: Jan. 30, 2024

(54) OPTICAL NAVIGATION DEVICE

(71) Applicant: PixArt Imaging Inc., Hsin-Chu (TW)

(72) Inventors: Sai Mun Lee, Penang (MY); Hun Kwang Lee, Penang (MY); Yee Loong Chin, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/535,662

(22) Filed: Nov. 25, 2021

(65) Prior Publication Data
US 2023/0161422 A1  May 25, 2023

(51) Int. Cl.
*G06F 3/03* (2006.01)
*G06F 3/0354* (2013.01)

(52) U.S. Cl.
CPC ........ *G06F 3/0317* (2013.01); *G06F 3/03541* (2013.01)

(58) Field of Classification Search
CPC .. G06F 3/0304; G06F 3/0317; G06F 3/03543; G06F 3/03
See application file for complete search history.

(56) References Cited

U.S. PATENT DOCUMENTS

| | | | | |
|---|---|---|---|---|
| 6,301,216 B1* | 10/2001 | Takahashi | ............ | G11B 7/1359 369/112.28 |
| 7,081,612 B1* | 7/2006 | Lu | ........................ | G06F 3/0317 250/221 |
| 7,675,020 B2* | 3/2010 | Machida | ............... | G06F 3/0317 250/221 |
| 7,868,281 B2* | 1/2011 | Leong | ................. | G06F 3/03543 250/221 |
| 8,780,045 B2* | 7/2014 | Song | ....................... | G06F 3/038 345/166 |
| 9,218,069 B2* | 12/2015 | Lee | ...................... | G06F 3/03543 |
| 11,550,161 B2* | 1/2023 | Lee | ..................... | G02B 19/0014 |
| 2005/0024624 A1* | 2/2005 | Gruhlke | ................ | G06F 3/0421 356/3.01 |
| 2005/0094154 A1* | 5/2005 | Baney | ................. | G06F 3/03544 356/499 |
| 2005/0231465 A1* | 10/2005 | DePue | ..................... | G01D 5/30 345/156 |
| 2005/0231482 A1* | 10/2005 | Theytaz | ................ | G06F 3/0317 345/166 |
| 2006/0119580 A1* | 6/2006 | Chien | ................... | G06F 3/0317 345/166 |
| 2007/0285392 A1* | 12/2007 | Lee | ....................... | G06F 3/0317 345/166 |

(Continued)

*Primary Examiner* — Olga V Merkoulova
(74) *Attorney, Agent, or Firm* — Winston Hsu

(57) ABSTRACT

An optical navigation device includes a casing, a circuit board, an illumination light source and an optical receiver. The casing is movably located above a navigation surface. The circuit board is disposed inside the casing. The illumination light source is disposed on the circuit board and adapted to provide an illumination channel toward the navigation surface. The optical receiver is disposed adjacent to the illumination light source. An imaging channel of the optical receiver is substantially parallel to a planar normal vector of the navigation surface, and the optical receiver is adapted to identify features on the navigation surface within a range crossed by the imaging channel and the illumination channel for providing navigation information.

14 Claims, 5 Drawing Sheets

(56) References Cited

U.S. PATENT DOCUMENTS

| | | | |
|---|---|---|---|
| 2008/0061220 A1* | 3/2008 | Machida | G06F 3/0317 250/221 |
| 2008/0117439 A1* | 5/2008 | Leong | G06F 3/0317 356/614 |
| 2012/0127076 A1* | 5/2012 | Song | G06F 3/038 345/166 |
| 2012/0138778 A1* | 6/2012 | Campbell | G06F 3/03547 250/227.11 |
| 2020/0033611 A1* | 1/2020 | Lee | G02B 19/009 |
| 2021/0199982 A1* | 7/2021 | Lee | G02B 27/0905 |

\* cited by examiner

OPTICAL NAVIGATION DEVICE

BACKGROUND OF THE INVENTION

1. Field of the Invention

The present invention relates to an optical navigation device, and more particularly, to an optical navigation device with enhanced depth of field.

2. Description of the Prior Art

A conventional optical mouse disposes an illumination light source and an optical receiver on a circuit board inside a casing of the optical mouse. An illumination channel of the illumination light source and an imaging channel of the optical receiver are crossed and respectively slanted toward a navigation surface, and the optical receiver acquires a feature on the navigation surface for feature analysis and identification via specular reflection detection. The crossed range of the illumination channel and the imaging channel are located between the optical mouse and the navigation surface, and a height of the crossed range is interpreted as a working depth of field of the conventional optical mouse. Generally, an included angle between the navigation surface and one direction of the illumination channel and/or the imaging channel is about sixty degrees, and illumination light emitted by the illumination light source has a consistent beam size. Thus, the conventional optical mouse cannot have the longer working depth of field due to design constraint of its optical system.

SUMMARY OF THE INVENTION

The present invention provides an optical navigation device with enhanced depth of field for solving above drawbacks.

According to the claimed invention, an optical navigation device includes a casing, a circuit board, an illumination light source and an optical receiver. The casing is movably located above a navigation surface. The circuit board is disposed inside the casing. The illumination light source is disposed on the circuit board and adapted to provide an illumination channel toward the navigation surface. The optical receiver is disposed adjacent to the illumination light source. An imaging channel of the optical receiver is substantially parallel to a planar normal vector of the navigation surface, and the optical receiver is adapted to identify features on the navigation surface within a range crossed by the imaging channel and the illumination channel for providing navigation information.

According to the claimed invention, the optical receiver is an optical sensor array, and the imaging channel points toward the navigation surface along a planar normal vector of the optical sensor array. An included angle between the imaging channel of the optical receiver and the planar normal vector of the navigation surface is smaller than a predefined angle range.

According to the claimed invention, an aperture is formed on the casing and comprises an output plane aligning with an outer surface of the casing, and the imaging channel is crossed with the illumination channel between the output plane and the navigation surface. The imaging channel and the illumination channel are crossed at the output plane to provide a near-end interception point, and a distance between the optical receiver and the near-end interception point is smaller than a distance between the optical receiver and other position on the output plane.

According to the claimed invention, the illumination light source includes a lighting unit and a collimator lens, illumination light emitted by the lighting unit passes through the collimator lens to form the collimating illumination channel. Further, the illumination light source may include a lighting unit and a non-collimator lens, illumination light emitted by the lighting unit passes through the non-collimator lens to form the diverging illumination channel.

According to the claimed invention, the illumination light source includes a lighting unit and a lens module, the lens module includes a convex lens and a light deviating component, and illumination light emitted by the lighting unit passes through the convex lens and is deviated by the light deviating component. Further, the illumination light source includes a lighting unit and a lens module, the lens module includes a Fresnel lens and a light deviating component, and the illumination light emitted by the lighting unit passes through the Fresnel lens and is deviated by the light deviating component.

According to the claimed invention, the illumination light source includes a lighting unit and a lens module, the lens module includes a convex lens and an optical multi-facet component, and illumination light emitted by the lighting unit passes through the convex lens and is deviated by the optical multi-facet component. The illumination light is divided into a plurality of beams via the optical multi-facet component, and the plurality of beams is overlapped or not overlapped within the illumination channel.

According to the claimed invention, the illumination light source comprises a lighting unit and a lens module, the lens module comprises a Fresnel lens and an optical multi-facet component, illumination light emitted by the lighting unit passes through the Fresnel lens and is deviated by the optical multi-facet component.

According to the claimed invention, the illumination light source comprises a lighting unit and a lens module, the lens module comprises two Fresnel lenses, illumination light emitted by the lighting unit passes through the Fresnel lenses to form a plurality of beams overlapped or not overlapped within the illumination channel. An included angle is set between the two Fresnel lenses, and the illumination light is deviated according to the included angle when passing through the two Fresnel lenses.

The optical navigation device of the present invention can utilize several optically systematic designs to provide a plurality of embodiments with the long working depth of field. The optical navigation device can emit the illumination light via the illumination light source, and the illumination light can pass through the lens assembly to form the collimating or diverging illumination light slanted toward the navigation surface. The illumination light can be reflected by the navigation surface and then received by the optical receiver. The imaging channel of the optical receiver can be perpendicular to or substantially perpendicular to the navigation surface, and the optical receiver can acquire the features on the navigation surface via the diffuse reflection detection for the feature analysis and identification. That is to say, the imaging channel of the optical receiver and the illumination channel of the illumination light source in the present invention can be crossed to provide the enlarged crossed range, so as to increase the working depth of field of the optical navigation device. The optical navigation device with the increased working depth of field can be applied for a metallic surface, a transparent surface, a translucent surface, an opaque surface, a fabric surface, a printed or painted surface, or any surfaces capable of reflecting or diffusing the illumination light.

The optical navigation device of the present invention can design the imaging channel of the optical receiver being substantially parallel to the planar normal vector of the navigation surface, which can increase the working depth of field and effectively narrow an interval between the optical receiver and the illumination light source for reducing the overall size of the optical navigation device, and further can economize material and package cost for preferred market competition.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
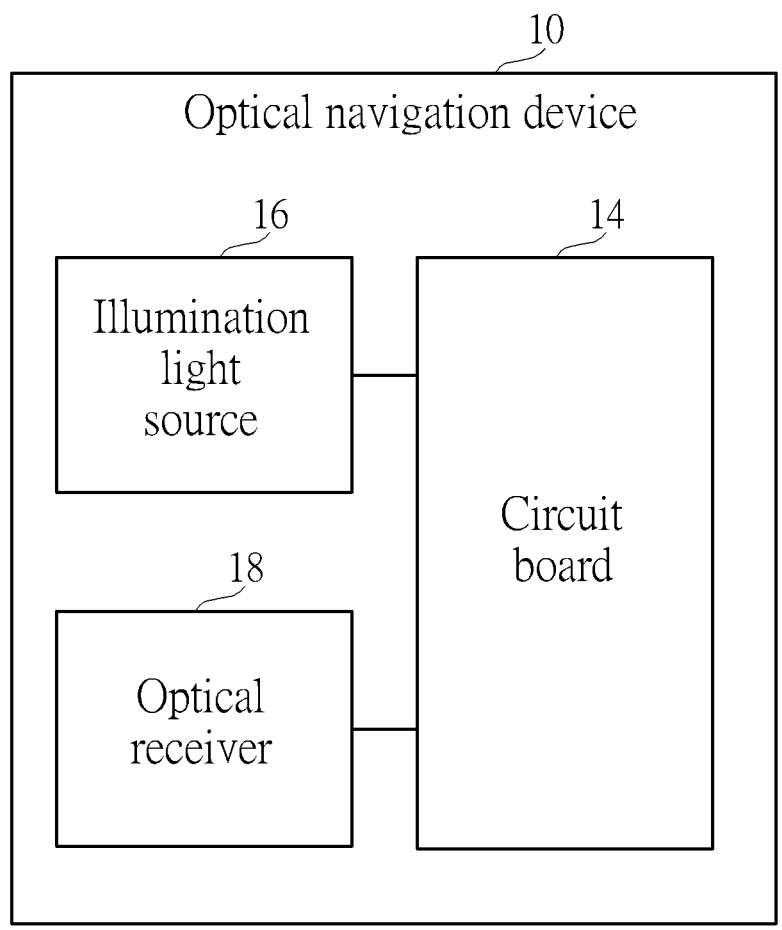
FIG. 1 is a functional block diagram of an optical navigation device according to an embodiment of the present invention.
Figure 2:
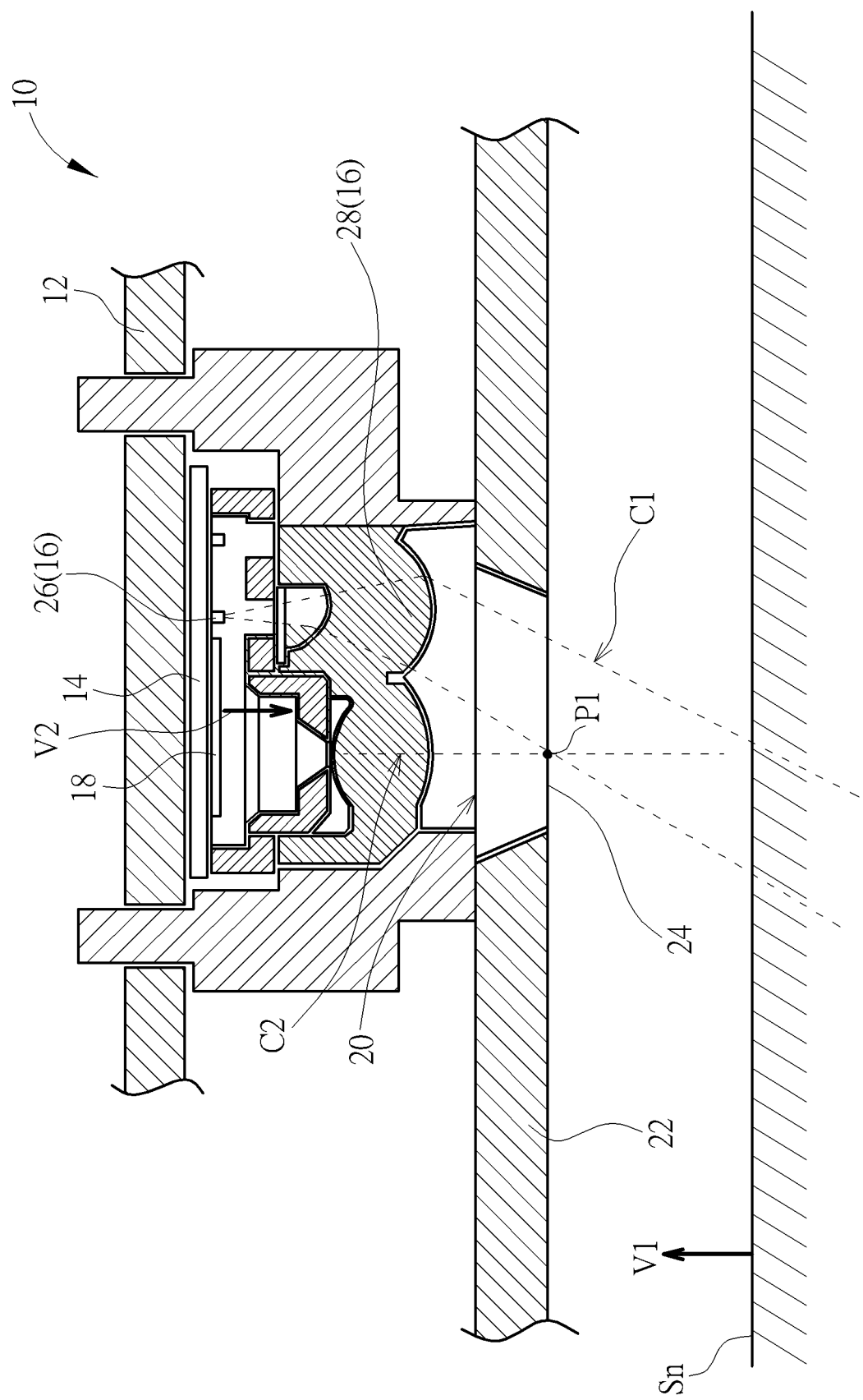
FIG. 2 is a structural diagram of the optical navigation device according to a first embodiment of the present invention.

Please refer to FIG. 1 and FIG. 2. FIG. 1 is a functional block diagram of an optical navigation device 10 according to an embodiment of the present invention. FIG. 2 is a structural diagram of the optical navigation device 10 according to a first embodiment of the present invention. The optical navigation device 10 can immediately detect a moving direction and a moving distance for acquiring path information when being moved relative to a navigation surface Sn. The optical navigation device 10 can utilize specific optical design to increase a working depth of field, so that the optical navigation device 10 can still detect a correct moving path when being moved and lifted relative to the navigation surface Sn.

For example, the optical navigation device 10 can be installed inside a mouse. The mouse may be slightly spaced from the desk (which means the navigation surface Sn) due to excessive force applied on the mouse, and the optical navigation device 10 still can acquire the correct moving path in response to a lifting height smaller than the working depth of field. Besides, the optical navigation device 10 may be installed on a bottom of a cleaning robot. The cleaning robot may be inclined when some wheels of the cleaning robot climb up the carpet, and the optical navigation device 10 still can acquire the correct moving path in response to the working depth of field greater than a thickness of the carpet.

The optical navigation device 10 can include a casing 12, a circuit board 14, an illumination light source 16 and an optical receiver 18. The casing 12 can be a shell of the mouse or the cleaning robot, and can be freely moved above the navigation surface Sn in accordance with user's operation. The circuit board 14 can be disposed inside the casing 12. The illumination light source 16, the optical receiver 18 and other electronic components can be disposed on the circuit board 14. The illumination light source 16 can be a laser diode or a light emitting diode or any possible lighting units, which provides an illumination channel C1 projected onto the navigation surface Sn. The optical receiver 18 can be located adjacent to the illumination light source 16 and provide an imaging channel C2 substantially parallel to a planar normal vector V1 of the navigation surface Sn. A range crossed by the illumination channel C1 and the imaging channel C2 can be defined as the working depth of field of the optical navigation device 10. The optical receiver 18 can accurately identify features on the navigation surface Sn for providing navigation information as long as the lifting height of the optical navigation device 10 relative to the navigation surface Sn is smaller than the foresaid crossed range.

The casing 12 can have an aperture 20. The aperture 20 can have an output plane 24 aligning with an outer surface 22 of the casing 12. The output plane 24 may be interpreted as a virtual plane located on a boundary of the aperture 20 facing the casing 12 outwardly. As shown in FIG. 2, the imaging channel C2 can be perpendicular to the navigation surface Sn, and the illumination channel C1 is slanted relative to the navigation surface Sn, so that the foresaid crossed range between the imaging channel C2 and the illumination channel C1 can be further defined as a region between the output plane 24 and the navigation surface Sn, and therefore the optical navigation device 10 can have the largest working depth of field. Thus, the imaging channel C2 and the illumination channel C1 can be crossed at the output plane 24 to provide a near-end interception point P1, and a distance of the near-end interception point P1 relative to the optical receiver 18 can be smaller than a distance of any other position on the output plane 24 relative to the optical receiver 18, which means the near-end interception point P1 is directly below the optical receiver 18; the said structural feature can correspond to a design demand of the imaging channel C2 perpendicular to the navigation surface Sn.

The optical receiver 18 can have a computing function, which can receive and identify the features on the navigation surface Sn to immediately acquire the navigation information. Further, the optical navigation device 10 may additionally include an operation processor (which is not shown in the figures) disposed on the circuit board 14, and the optical receiver 18 acquires and transmits the features on the navigation surface Sn toward the operation processor for executing feature identification and computation of the navigation information. Computation of the optical navigation device 10 is not limited to the computing function of the optical receiver 18 and the operation processor of the circuit board 14, which depends on the design demand.

In the present invention, the optical receiver 18 can be an optical sensor array, and the optical sensor array can include a plurality of optical sensing unit arranged as a matrix. As shown in FIG. 2, a planar normal vector V2 of the optical sensor array can be substantially parallel to the planar normal vector V1 of the navigation surface Sn, and the imaging channel C2 of the optical receiver 18 can point toward the navigation surface Sn along the planar normal vector V2 of the optical sensor array. Moreover, the present invention may define that an included angle between the imaging channel C2 of the optical receiver 18 and the planar normal vector V1 of the navigation surface Sn can be smaller than a predefined angle range, and a value of the predefined angle range can depend on the design demand, such as five degrees.

In the first embodiment, the illumination light source 16 can include a lighting unit 26 and a collimator lens 28. Illumination light emitted by the illumination light source 16 can pass through the collimator lens 28 to form the collimating illumination channel C1. The imaging channel C2 can be perpendicular to the navigation surface Sn, and the optical receiver 18 can acquire the features on the navigation surface Sn for the feature identification via diffuse reflection detection; the near-end interception point P1 can be disposed on a position of the output plane 24 closest to the optical receiver 18, and the optical receiver 18 can receive the sampling features conforming to an illumination demand even though the illumination light emitted by the illumination light source 16 has low intensity, so as to improve power delivery of the optical navigation device 10. In addition, the optical receiver 18 can be set close to the illumination light source 16, so that the optical navigation device 10 can have a more compact design for small sizes of the mouse or the cleaning robot.

Figure 3:
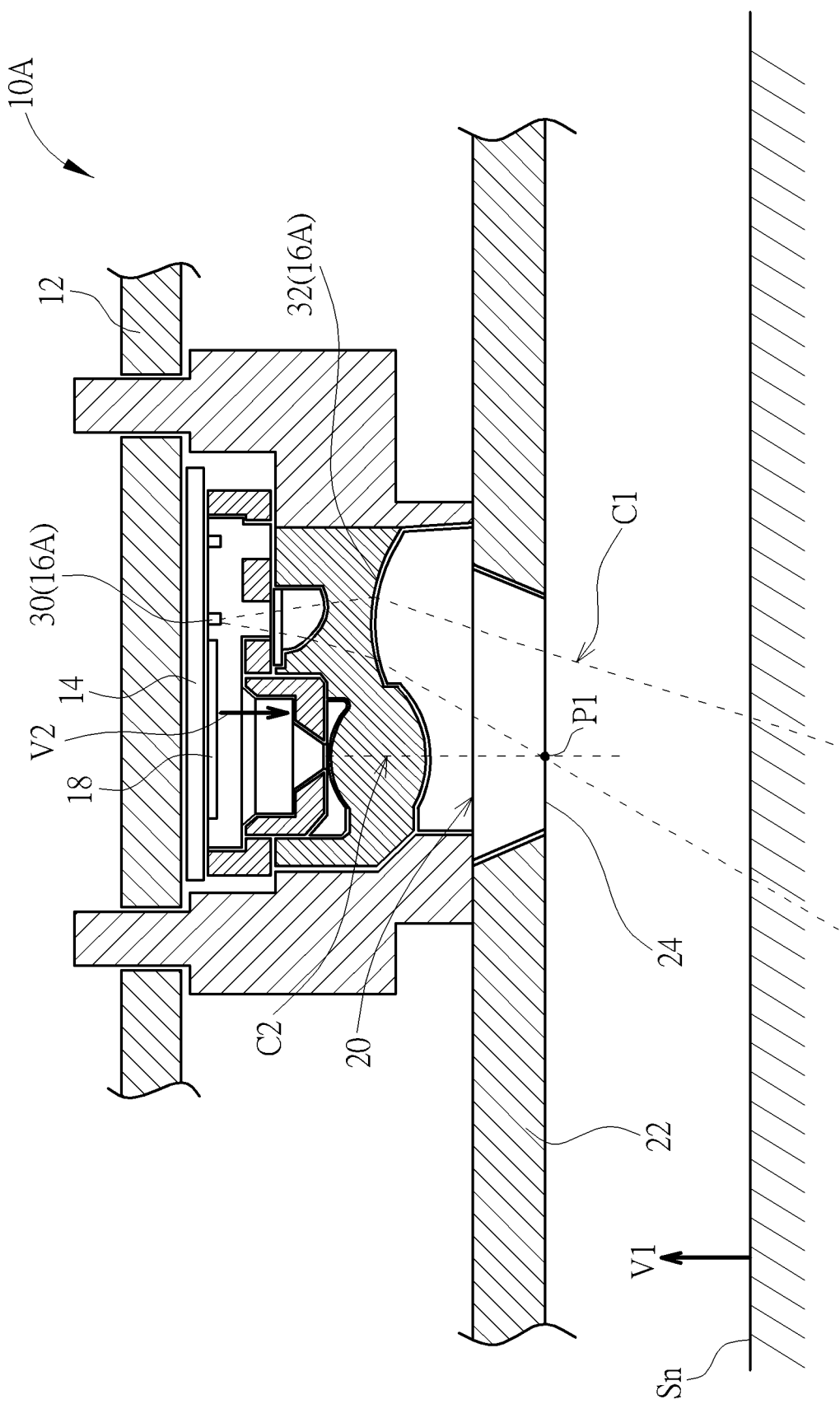
FIG. 3 is structural diagram of the optical navigation device according to a second embodiment of the present invention.

Please refer to FIG. 3. FIG. 3 is structural diagram of the optical navigation device 10A according to a second embodiment of the present invention. In the second embodiment, elements having the same numerals as ones of the first embodiment have the same structures and functions, and a detailed description is omitted herein for simplicity. The illumination light source 16A of the optical navigation device 10A can include a lighting unit 30 and a non-collimator lens 32. The illumination light emitted by the lighting unit 30 can pass through the non-collimator lens 32 to form the diverging illumination channel C1. The imaging channel C2 of the second embodiment can be perpendicular to the navigation surface Sn, and the optical receiver 18 can acquire the features on the navigation surface Sn for the feature identification via the diffuse reflection detection.

The near-end interception point P1 can be disposed on the position of the output plane 24 closest to the optical receiver 18, and the optical receiver 18 can receive the sampling features conforming to the illumination demand even though the illumination light emitted by the illumination light source 16A has the low intensity, so as to improve the power delivery of the optical navigation device 10A. Besides, the optical receiver 18 can be set close to the illumination light source 16A, so that the optical navigation device 10A can have more compact design for the small sizes of the mouse or the cleaning robot; therefore, comparing to the first embodiment, the second embodiment can enlarge a beam size of the illumination channel C1 via the non-collimator lens 32 for increasing the working depth of field.

Figure 4:
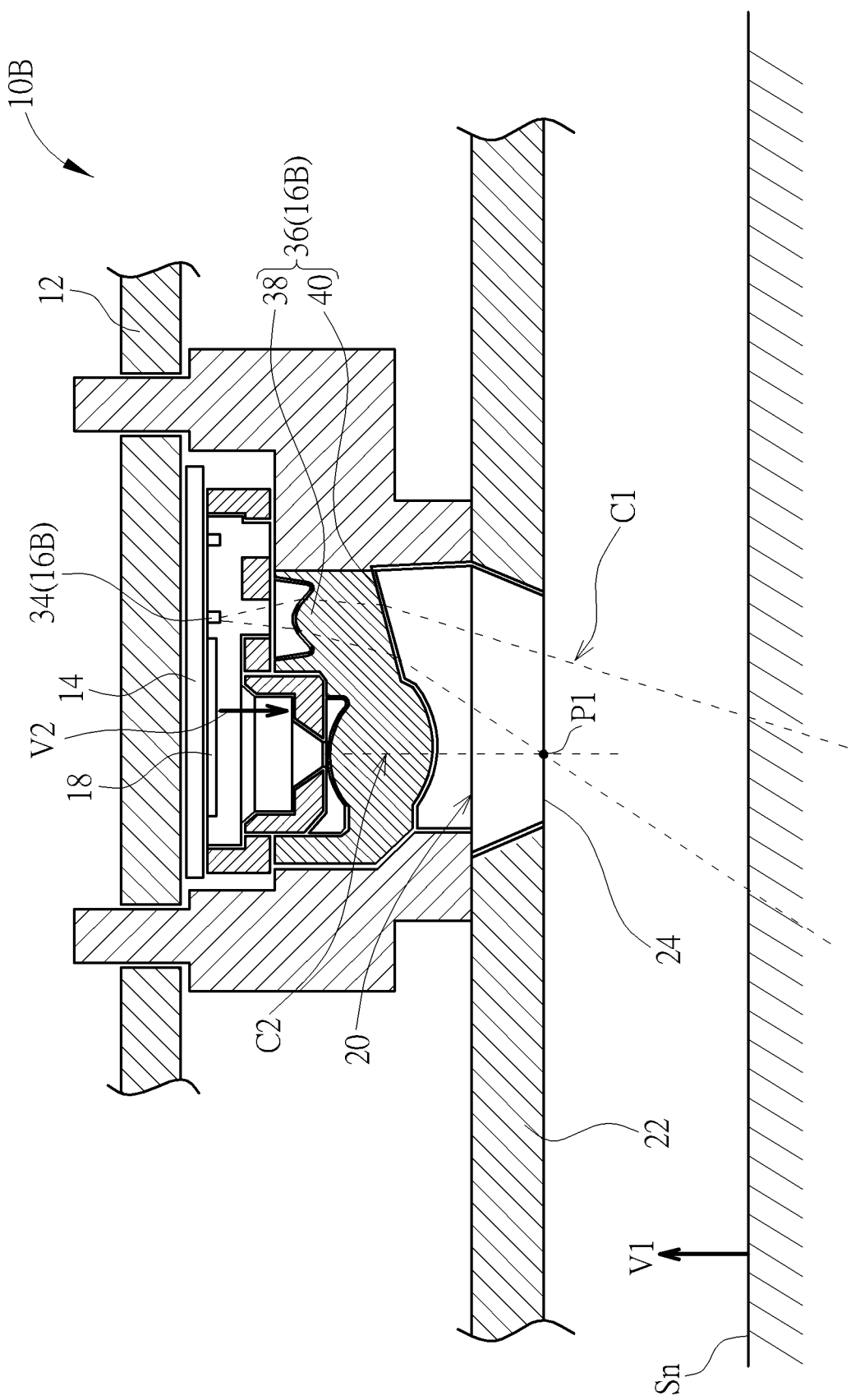
FIG. 4 is structural diagram of the optical navigation device according to a third embodiment of the present invention.

Please refer to FIG. 4. FIG. 4 is structural diagram of the optical navigation device 10B according to a third embodiment of the present invention. In the third embodiment, elements having the same numerals as ones of the foresaid embodiments have the same structures and functions, and a detailed description is omitted herein for simplicity. The illumination light source 16B of the optical navigation device 10B can include a lighting unit 34 and a lens module 36. The illumination light emitted by the lighting unit 34 can be deviated by the lens module 36. The lens module 36 can include a collimator lens 38 and a light deviating component 40. The illumination light of the lighting unit 34 can pass through the collimator lens 38 to form the collimating illumination light, and the collimating illumination light can be deviated and slanted toward the navigation surface Sn when passing through the light deviating component 40. Optical functions of the collimator lens 38 are not limited to the above-mentioned embodiment, and may be replaced with other-type lenses.

In the third embodiment, the collimator lens 38 can be designed as a convex lens for providing the collimating optical path; or, the collimator lens 38 can be designed as a Fresnel lens, which utilizes a plurality of optical concentric ring structures to provide the collimating optical path and an ultra-short focus feature. The light deviating component 40 can be designed as an optical wedge, and the optical transmission path can be slightly deviated the illumination light passes through the optical wedge. Comparing to the foresaid embodiments, the third embodiment can further increase the working depth of field of the optical navigation device 10B.

Figure 5:
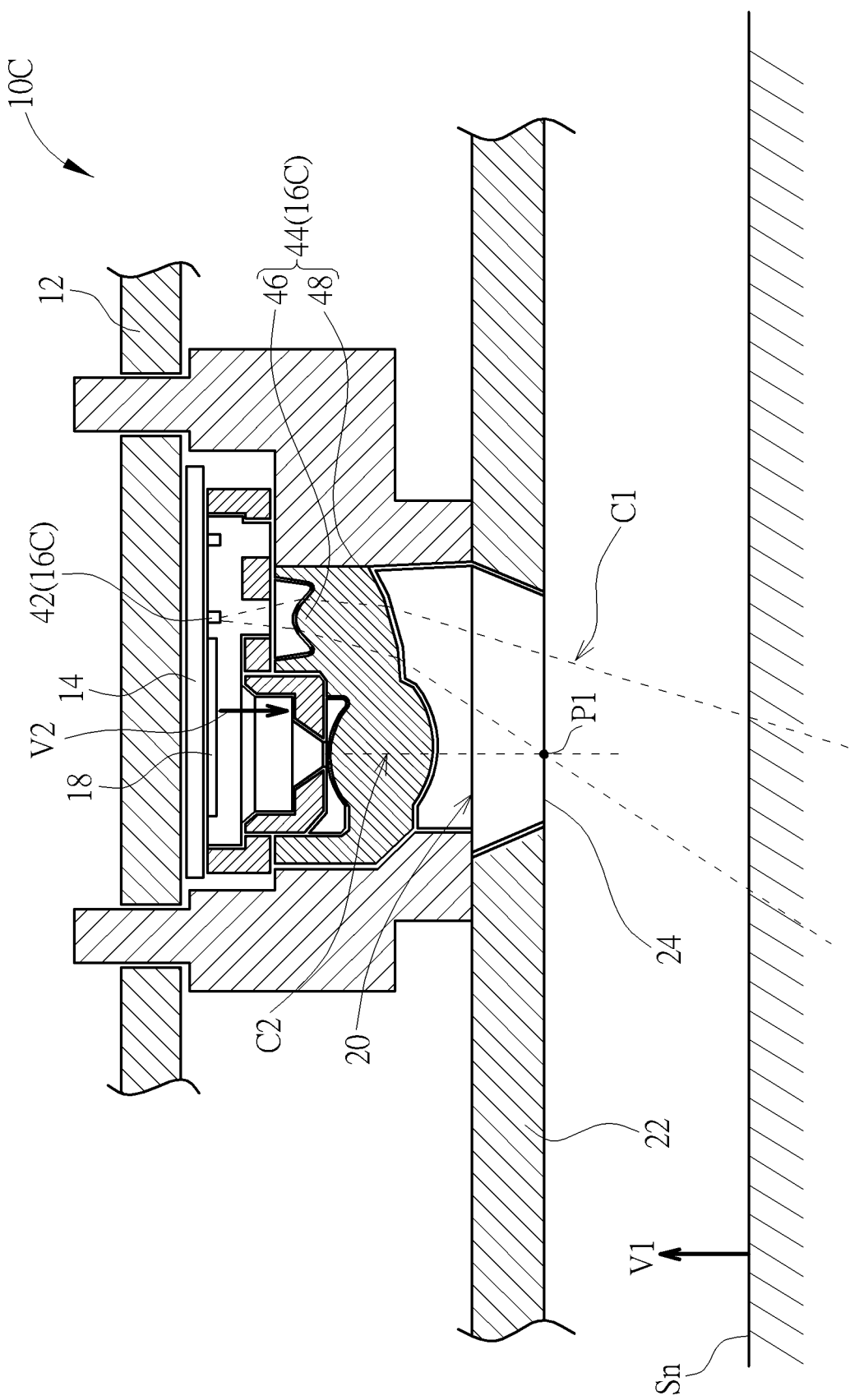
FIG. 5 is structural diagram of the optical navigation device according to a fourth embodiment of the present invention.

Please refer to FIG. 5. FIG. 5 is structural diagram of the optical navigation device 10C according to a fourth embodiment of the present invention. In the fourth embodiment, elements having the same numerals as ones of the foresaid embodiments have the same structures and functions, and a detailed description is omitted herein for simplicity. The illumination light source 16C of the optical navigation device 10C can include a lighting unit 42 and a lens module 44. The illumination light emitted by the lighting unit 42 can be deviated by the lens module 44. The lens module 44 can include a first lens 46 and a second lens 48. The illumination light of the lighting unit 42 can be transformed into the collimating illumination light when passing through the first lens 46. The collimating illumination light can be deviated and slanted toward the navigation surface Sn when passing through the second lens 48. The first lens 46 and the second lens 48 can be optical components with any types, and any optical lens conforming to the above-mentioned functional demands belongs to a design scope of the present invention.

For example, the first lens 46 can be designed as the convex lens or the Fresnel lens. The convex lens and the Fresnel lens can transform the diverging light into the collimating light, and the Fresnel lens can further provide the ultra-short focus feature. The second lens 48 can be designed as an optical multi-facet component or the Fresnel lens. The illumination light of the lighting unit 42 can be divided into a plurality of beams when passing through the optical multi-facet component due to specific structural functions (such as difference in angles of refraction) of the optical multi-facet component, and the plurality of beams may be overlapped or not overlapped within the illumination channel C1. The Fresnel lens can include the plurality of optical concentric ring structures, and the illumination light can be divided into several overlapped or non-overlapped beams within the illumination channel C1 when passing through the Fresnel lens. If both the first lens 46 and the second lens 48 are the Fresnel lenses, an included angle between the two Fresnel lenses can be preferably set, and the illumination light can be deviated in respond to the included angle when passing through the two Fresnel lenses. A value of the foresaid included angle can be set in accordance with an inclined angle of the illumination channel C1 relative to the navigation surface Sn, and the detailed description is omitted herein for simplicity.

In conclusion, the optical navigation device of the present invention can utilize several optically systematic designs to provide a plurality of embodiments with the long working depth of field. The optical navigation device can emit the illumination light via the illumination light source, and the illumination light can pass through the lens assembly to form the collimating or diverging illumination light slanted toward the navigation surface. The illumination light can be reflected by the navigation surface and then received by the optical receiver. The imaging channel of the optical receiver can be perpendicular to or substantially perpendicular to the navigation surface, and the optical receiver can acquire the features on the navigation surface via the diffuse reflection detection for the feature analysis and identification. That is to say, the imaging channel of the optical receiver and the illumination channel of the illumination light source in the present invention can be crossed to provide the enlarged crossed range, so as to increase the working depth of field of the optical navigation device. The optical navigation device with the increased working depth of field can be applied for a metallic surface, a transparent surface, a translucent surface, an opaque surface, a fabric surface, a printed or painted surface, or any surfaces capable of reflecting or diffusing the illumination light.

Comparing to the prior art, the optical navigation device of the present invention can design the imaging channel of the optical receiver being substantially parallel to the planar normal vector of the navigation surface, which can increase the working depth of field and effectively narrow an interval between the optical receiver and the illumination light source for reducing the overall size of the optical navigation device, and further can economize material and package cost for preferred market competition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device, comprising:
a casing movably located above a navigation surface;
a circuit board disposed inside the casing;
an illumination light source disposed on the circuit board and adapted to provide an illumination channel toward the navigation surface; and
an optical receiver disposed adjacent to the illumination light source, an imaging channel of the optical receiver being substantially parallel to a planar normal vector of the navigation surface and further slantwise crossed by the illumination channel, and the optical receiver being adapted to acquire and identify features on the navigation surface within a crossed range formed between the imaging channel and the illumination channel for providing navigation information via diffuse reflection detection, wherein the crossed range is defined as a working depth of field of the optical navigation device.

2. The optical navigation device of claim 1, wherein the optical receiver is an optical sensor array, and the imaging channel points toward the navigation surface along a planar normal vector of the optical sensor array.

3. The optical navigation device of claim 1, wherein an included angle between the imaging channel of the optical receiver and the planar normal vector of the navigation surface is smaller than a predefined angle range.

4. The optical navigation device of claim 1, wherein an aperture is formed on the casing and comprises an output plane aligning with an outer surface of the casing, the imaging channel is crossed with the illumination channel between the output plane and the navigation surface.

5. The optical navigation device of claim 4, wherein the imaging channel and the illumination channel are crossed at the output plane to provide a near-end interception point, and a distance between the optical receiver and the near-end interception point is smaller than a distance between the optical receiver and other position on the output plane.

6. The optical navigation device of claim 1, wherein the illumination light source comprises a lighting unit and a collimator lens, illumination light emitted by the lighting unit passes through the collimator lens to form the collimating illumination channel.

7. The optical navigation device of claim 1, wherein the illumination light source comprises a lighting unit and a non-collimator lens, illumination light emitted by the lighting unit passes through the non-collimator lens to form the diverging illumination channel.

8. The optical navigation device of claim 1, wherein the illumination light source comprises a lighting unit and a lens module, the lens module comprises a convex lens and a light deviating component, illumination light emitted by the lighting unit passes through the convex lens and is deviated by the light deviating component.

9. The optical navigation device of claim 1, wherein the illumination light source comprises a lighting unit and a lens module, the lens module comprises a Fresnel lens and a light deviating component, illumination light emitted by the lighting unit passes through the Fresnel lens and is deviated by the light deviating component.

10. The optical navigation device of claim 1, wherein the illumination light source comprises a lighting unit and a lens module, the lens module comprises a convex lens and an optical multi-facet component, illumination light emitted by the lighting unit passes through the convex lens and is deviated by the optical multi-facet component.

11. The optical navigation device of claim 10, wherein the illumination light is divided into a plurality of beams via the optical multi-facet component, and the plurality of beams is overlapped or not overlapped within the illumination channel.

12. The optical navigation device of claim 1, wherein the illumination light source comprises a lighting unit and a lens module, the lens module comprises a Fresnel lens and an optical multi-facet component, illumination light emitted by the lighting unit passes through the Fresnel lens and is deviated by the optical multi-facet component.

13. The optical navigation device of claim 1, wherein the illumination light source comprises a lighting unit and a lens module, the lens module comprises two Fresnel lenses, illumination light emitted by the lighting unit passes through the Fresnel lenses to form a plurality of beams overlapped or not overlapped within the illumination channel.

14. The optical navigation device of claim 13, wherein an included angle is set between the two Fresnel lenses, and the illumination light is deviated according to the included angle when passing through the two Fresnel lenses.

* * * * *